United States Patent Office 3,242,214
Patented Mar. 22, 1966

3,242,214
METAL ACETYLIDE CONVERSION
Moses Wolf Goldberg, Upper Montclair, Richard Wightman Kierstead, North Caldwell, and Walter Kimel, Highland Park, N.J., assignors to Hoffman-La Roche Inc., Nutley, N.J., a corporation of New Jersey
No Drawing. Filed Aug. 7, 1962, Ser. No. 215,289
2 Claims. (Cl. 260—586)

The present invention relates to the preparation of 2-(1-ethinyl-1-hydroxyethyl)-7-oxo-1,2,3,4,4a,4b,5,6,7,9,10,10a-dodecahydrophenanthrene.

2-(1-ethinyl-1-hydroxyethyl)-7-oxo-1,2,3,4,4a,4b,5,6,7,9,10,10a-dodecahydrophenanthrene exhibits antiandrogenic activity and is useful as an antiandrogen.

The process of the invention is carried out by treating 2-acetyl-7-oxo-1,2,3,4,4a,4b,5,6,7,9,10,10a-dodecahydrophenanthrene (prepared in Example 5, U.S. 2,894,958) either with (a) acetylene in the presence of potassium tertiary amylate or butoxide, or, preferably, with (b) an alkali metal acetylide, preferably lithium acetylide, in liquid ammonia.

The present invention will be better understood by reference to the following examples which are given for illustration purposes only and are not meant to limit the invention.

Example 1

To a solution of 10.0 g. of potassium metal in 250 ml. of t-amyl alcohol is added a solution of 10.0 g. of 2-acetyl-7-oxo-1,2,3,4,4a,4b,5,6,7,9,10,10a - dodecahydrophenanthrene in 250 ml. of toluene. The air is displaced by a current of dry nitrogen, and a current of acetylene is passed through the stirred mixture for 6.5 hours at room temperature. The reaction mixture is then flushed with a current of nitrogen and allowed to stand overnight at room temperature. The cooled reaction mixture is diluted with 250 ml. of water followed by the addition of 250 ml. of 6 N hydrochloric acid. The resulting mixture is extracted with ether-methylene chloride (2.5:1), the organic extract washed with water and brine, then dried over anhydrous sodium sulfate, and evaporated to dryness. An oil remains which is chromatographed on 130 g. of neutral alumina. Elution with benzene-hexane (3:1) gives 4.60 g. (46%) of recovered starting material. Further elution with the same solvent mixture, followed by solvent combinations of benzene, benzene-ether (1:5), and ether gives 3.64 g. (33%) of crude 2-(1-ethinyl-1-hydroxyethyl)-7-oxo-1,2,3,4,4a,4b,5,6,7,9,10,10a-dodecahydrophenanthrene. Crystallization from methylene chloride-ether gives 1.186 g. of purified 2-(1-ethinyl-1-hydroxyethyl)-7-oxo-1,2,3,4,4a,4b,5,6,7,9,10,10a - dodecahydrophenanthrene.

Example 2

Lithium acetylide is prepared in a 12-liter, 3-necked flask equipped with dropping funnel, stirrer, gas entry tube, and Dry-Ice condenser, by bubbling acetylene through a solution of 8.0 g. of lithium in 4 liters of liquid ammonia. The addition of acetylene is continued for three hours after the disappearance of the blue color. Then a solution of 200 g. of 2-acetyl-7-oxo-1,2,3,4,4a,4b,5,6,7,9,10,10a-dodecahydrophenanthrene in 4 liters of toluene is added with sufficient stirring during the course of 75 minutes, and the reaction allowed to continue overnight. Then 200 g. of ammonium chloride is added cautiously. The Dry-Ice condenser is removed and the ammonia allowed to evaporate. Four liters of water is added to the residue, the layers separated, and the aqueous phase extracted with 1 liter of toluene. The organic portions are combined, washed with saturated sodium chloride solution until neutral, dried over sodium sulfate, and concentrated under vacuum to a crude oil. The crude oil is dissolved in 1 liter of ether and allowed to crystallize for several days at 0° C. 121.2 g. of crude 2-(1-ethinyl-1-hydroxyethyl)-7-oxo-1,2,3,4,4a,4b,5,6,7,9,10,10a-dodecahydrophenanthrene is obtained. An additional 14.1 g. is recovered from the mother liquor. The total yield of crude 2-(1-ethinyl-1-hydroxyethyl)-7-oxo-1,2,3,4,4a,4b,5,6,7,9,10,10a-dodecahydrophenanthrene is 135.3 g. The crude product is purified by crystallization from methylene chloride-ether to yield 101.5 g. of purified product.

It should be noted that the product prepared by the novel process of the invention does not comprise part of the instant invention; the invention relates only to the process for its preparation.

We claim:

1. A process for the preparation of 2-(1-ethinyl-1-hydroxyethyl)-7-oxo-1,2,3,4,4a,4b,5,6,7,9,10,10a - dodecahydrophenanthrene comprising the steps of treating 2-acetyl-7 - oxo - 1,2,3,4,4a,4b,5,6,7,9,10,10a-dodecahydrophenanthrene with alkali metal acetylide in liquid ammonia; and isolating 2-(1-ethinyl-1-hydroxyethyl)-7-oxo-1,2,3,4,4a,4b,5,6,7,9,10,10a-dodecahydrophenanthrene from the reaction mixture.

2. A process for the preparation of 2-(1-ethinyl-1-hydroxyethyl) - 7 - oxo - 1,2,3,4,4a,4b,5,6,7,9,10,10a-dodecahydrophenanthrene comprising the steps of treating 2-acetyl-7 - oxo - 1,2,3,4,4a,4b,5,6,7,9,10,10a-dodecahydrophenanthrene with lithium acetylide in liquid ammonia and isolating 2-(1-ethinyl-1-hydroxyethyl)-7-oxo-1,2,3,4,4a,4b,5,6,7,9,10,10a-dodecahydrophenanthrene from the reaction mixture.

References Cited by the Examiner

UNITED STATES PATENTS

| 2,732,405 | 1/1956 | Dodson et al. | 260—586 |
| 2,955,139 | 10/1960 | Hofer et al. | 260—586 |

OTHER REFERENCES

Ananchenko et al.: "Chem. Abs.," vol. 53 (1959), col. 16809f.

LEON ZITVER, *Primary Examiner.*

LORRAINE A. WEINBERGER, *Examiner.*

M. M. JACOBS, *Assistant Examiner.*